United States Patent [19]

Santiago

[11] Patent Number: 4,570,040

[45] Date of Patent: Feb. 11, 1986

[54] VANDAL-RESISTANT SWITCH ASSEMBLY

[76] Inventor: Elias Santiago, St. 15, Q-1 Versalles, Bayamon, P.R. 00619

[21] Appl. No.: 659,005

[22] Filed: Oct. 9, 1984

[51] Int. Cl.[4] ........ H01H 9/00; H01H 35/02; H04M 1/26

[52] U.S. Cl. ........ 200/52 R; 200/DIG. 1; 200/296

[58] Field of Search ........ 200/DIG. 1, DIG. 2, 200/52 R, 61.83, 5 R, 5 A, 159 R, 158, 29 C; 179/90 K

[56] References Cited

U.S. PATENT DOCUMENTS

| | | | |
|---|---|---|---|
| 1,696,712 | 12/1928 | Glaser | 200/61.83 X |
| 2,856,036 | 10/1958 | Muller | 200/52 R X |
| 3,881,077 | 4/1975 | Piber | 200/159 R X |
| 4,007,347 | 2/1977 | Haber | 200/52 R X |
| 4,031,348 | 6/1977 | Eberhardt | 200/159 R |

*Primary Examiner*—J. R. Scott

*Attorney, Agent, or Firm*—Oltman and Flynn

[57] ABSTRACT

An electrical switch assembly having a first switch contact member behind a housing panel which has an opening through which the shank of a bolt extends. The bolt shank carries a second switch contact member for engagement with the first switch contact member. An enlarged head on the bolt has a flat rear face for engaging the front of the housing panel around the opening. A rigid washer on the bolt shank is spaced slightly farther from the rear face of the bolt head than the thickness of the panel at the opening, so that normally the shank of the bolt tilts downward inside the housing. This establishes a first position of the second switch contact member, which is on the bolt shank, with respect to the first switch contact member. A person's finger pressing on the bolt head can raise the bolt shank to establish a second position of the second switch contact member.

13 Claims, 6 Drawing Figures

VANDAL-RESISTANT SWITCH ASSEMBLY

SUMMARY OF THE INVENTION

This invention relates to a vandal-resistant electrical switch assembly.

One of the problems with push-button switches, such as those on public pay telephones or on the intercom panels at apartment building entrances, is that they are susceptible to damage by careless use or deliberate vandalism which can render inoperative the telephone or intercom, for example. To keep such equipment functioning properly can be a continuing, expensive problem.

The present invention is directed to novel switch assembly which substantially overcomes this problem. The only exposed part of the present switch is the head of a bolt whose shank extends into the switch housing. In the absence of pressure, such as that of a person's finger, on the front of the bolt head there is enough "play" or clearance between the flat back face of the bolt head and the outside of the switch housing that the shank of the bolt tilts slightly downward inside the switch housing. A switch contact on the shank of the bolt is immediately below another switch contact and, when the shank of the bolt tilts downward, these switch contacts do not engage. Finger pressure on the front of the bolt head will push its flat rear face flush against the outside of the housing and raise the shank of the bolt enough to bring the switch contact which it carries into engagement with the other switch contact, thus closing the switch.

Several such switches can be arranged in a group with the respective bolt heads forming the keyboard of a telephone or an apartment entrance intercom, for example.

A principle object of this invention is to provide an electrical switch assembly of novel construction which makes it resistant to careless use or vandalism.

Further objects and advantages of this invention will be apparent from the following detailed description of a presently preferred embodiment which is illustrated schematically in the accompanying drawings.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

Figure 1:
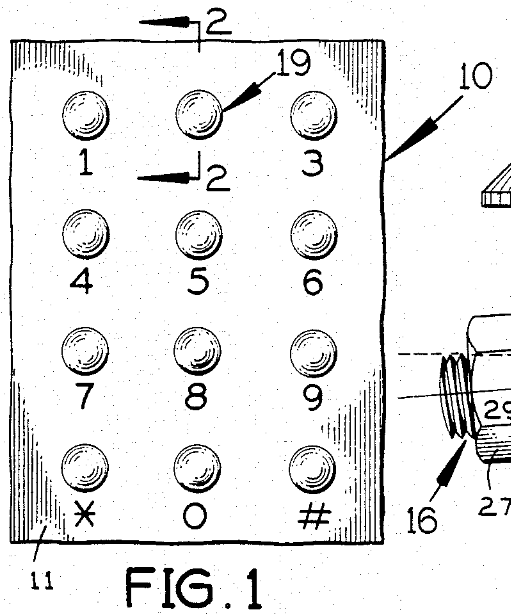
FIG. 1 is a plan view of a telephone push button array embodying switches in accordance with the present invention.

Referring first to FIGS. 1–4, the switch of the present invention may be one of several identical switches in a standard telephone push-button array, as shown in FIG. 1, presenting four horizontal rows of three push-buttons each. On a public pay telephone, the twelve push-buttons are on a vertical outside panel 10 of a housing containing the switches.

Figure 2:
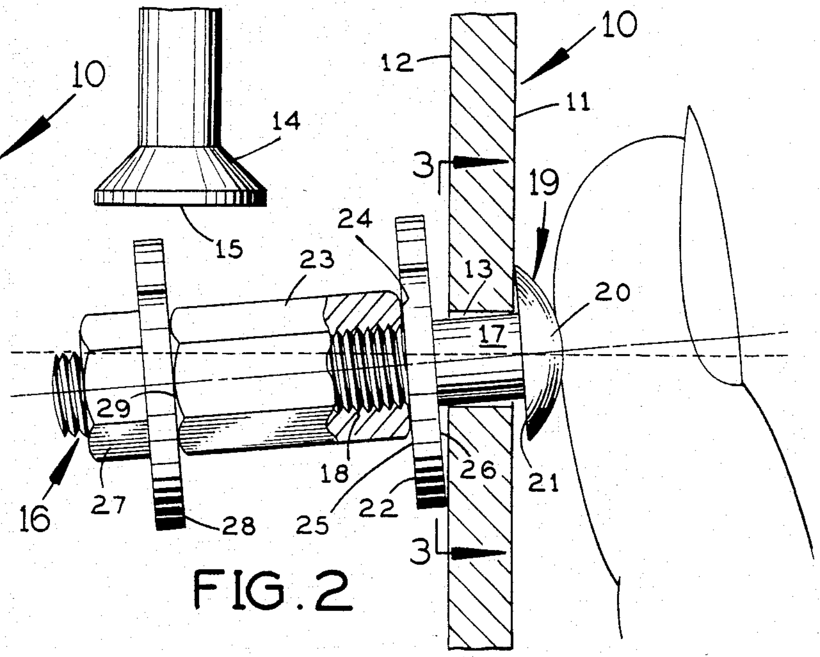
FIG. 2 is a longitudinal section through one of the switches, taken along the line 2—2 in FIG. 1, and showing the switch in its normally-open condition.
Figure 3:
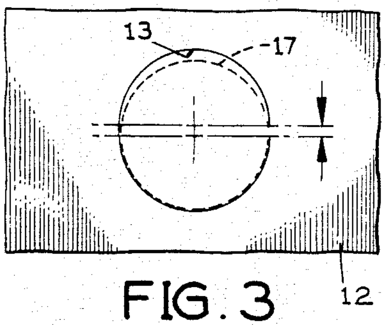
FIG. 3 is a cross-section taken along the line 3—3 in FIG. 2.

Referring to FIG. 2, the housing panel 10 is rigid and has a flat outer face 11 and a flat inner face 12 extending parallel to the outer face. An opening 13 extends perpendicularly between the outer and inner faces. As shown in FIG. 3, this opening may be oblong in cross-section, with a slightly larger diameter vertically than horizontally.

Inside the housing a short distance behind its outside panel 10 is a rigid, first switch contact member 14 of electrically conductive material which presents an exposed bottom face 15 extending horizontally at a level a short distance above that of the top edge of the panel opening 13. Contact member 14 may be a metal screw or bolt with an enlarged head which presents the bottom face 15. This screw or bolt is screw-threadedly adjustable in a dielectric support block (not shown) inside the housing to position its contact face 15 at the desired position vertically.

A rigid bolt 16 presents an elongated, straight shank with a cylindrical segment 17 passing through the panel opening 13 and a screw-threaded segment 18 at the inside of housing panel 10. Preferably, as shown in FIG. 3, the shank segment 17 has a close sliding fit in the panel opening 13 at their respective horizontal diameters and a slight clearance at their respective vertical diameters. Therefore, the bolt shank can rock vertically but not horizontally in the wall opening. On its outer end the bolt has an enlarged head 19 with a convex outer face 20 and a flat, annular, rear face 21 encircling the shank and extending perpendicular to the axis of the shank.

A rigid, flat, annular washer 22 is on the cylindrical segment 17 of the bolt shank directly behind the inner face 12 of housing panel 10. This washer has a central opening (not shown) which slidably receives the shank segment 17. An elongated nut 23 threadedly engages the screw-threaded segment 18 of the bolt shank and presents a substantially flat, outer end face 24 which abuts against the flat inner face 25 of washer 22. This nut defines a rearward limit stop for washer 22 and positions it so that the distance between the flat outer face 26 of this washer and the flat rear face 21 of bolt head 19 is slightly greater than the thickness of housing panel 10 between its inner and outer faces 12 and 11 at the panel opening 13. Thus, there is a slight clearance or "play" between bolt and washer assembly 16,22 and the housing panel 10 at the opening 13, as shown in exaggerated fashion in FIG. 2.

A second nut 27 is threaded onto the inner end of the bolt shank and it holds a second switch contact member 28 of electrically conductive material tightly against the generally flat inner end face 29 of elongated nut 23. Preferably, as shown, contact member 28 is a flat, annular, metal washer with a central opening which passes the screw-threaded segment 18 of the bolt shank. Part of the second switch contact member 28 extends up from the bolt shank directly below the bottom contact face 15 of the first switch contact member 14.

Normally, the combined weight of the bolt shank and washers 22 and 28 and nuts 23 and 27 at the inside of the housing panel 10 is enough to cause the bolt shank to tilt downward far enough to keep the second switch contact member 28 spaced from the bottom face 15 of the first switch contact member. This is shown in exaggerated detail in FIG. 2. However, it is to be understood that the normal separation of the switch contacts is not as great as appears in this Figure. This downward tilting of the bolt shank is possible because of the already described clearance or play between (1) the rear face 21 of bolt head 19 and washer 22 and (2) the opposite faces of housing panel 10.

Figure 4:
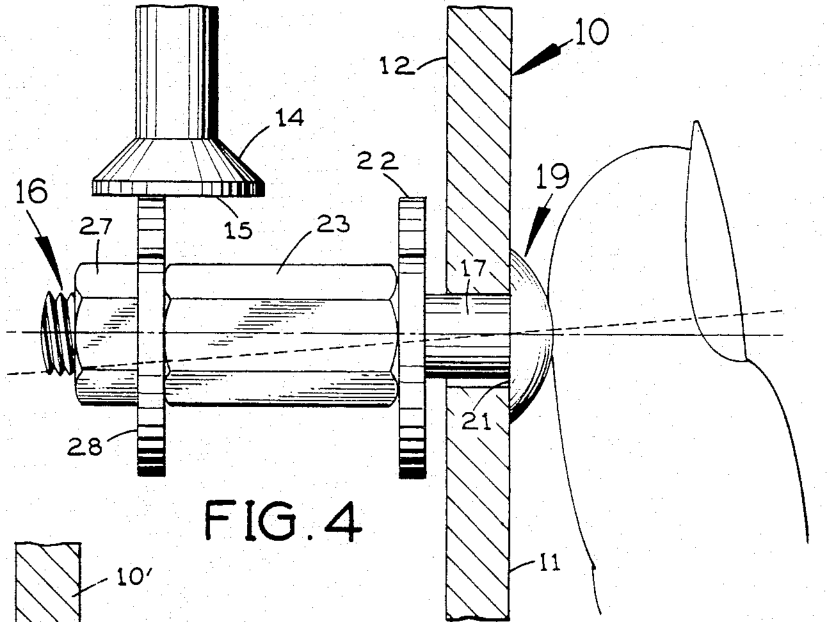
FIG. 4 is a view similar to FIG. 2 but showing the switch closed by the force exerted by a person's finger.

When a person presses his or her finger or thumb against the rounded outer face 20 of the bolt head 19, it rocks or tilts the bolt shank from the position shown in FIG. 2 to the position shown in FIG. 4. As shown in FIG. 4 the force of the finger or thumb positions the flat rear face 21 of the bolt head 19 flush against the outer face 11 of housing panel 10 around the opening 13, and this raises the bolt shank at the inside of this housing panel enough to bring the second switch contact member 28 up into conductive engagement with the bottom face 15 of the first switch contact member 14, thus closing the switch.

Figure 5:
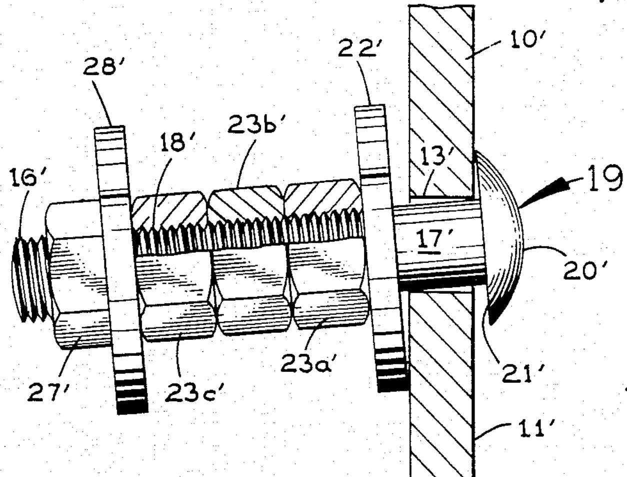
FIG. 5 is a view similar to FIG. 2 and showing a second embodiment of the present switch.

FIG. 5 shows a second embodiment of the invention in which the single elongated nut 23 of FIG. 2 is replaced by three smaller nuts *23a'*, *23b'* and *23c'* arranged end to end. Except for this, the embodiment of FIG. 5 is the same as the embodiment of FIG. 2. Elements in FIG. 5 which correspond to those in FIG. 2 are given the same reference numerals with a "prime" suffix added.

Figure 6:
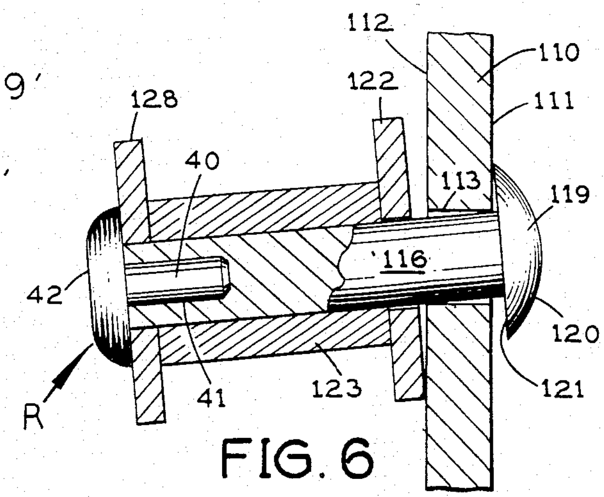
FIG. 6 is a similar view of a third embodiment of the present switch.

FIG. 6 shows a third embodiment of the invention in which corresponding elements or features have the same reference numerals plus 100 as those in FIG. 2. In FIG. 6 the bolt has an elongated straight shank 116 which has a cylindrical outer surface throughout its entire extent behind the bolt head 119. The bolt head has a convex outer face 120 and a flat annular face 121 the same as in FIG. 2. An annular, rigid, spacer sleeve 123 is slidably received on the bolt shank between flat, annular washers 122 and 128. On the inner end of the bolt shank 116, a rivet R has its shank 40 tightly received in an axial recess 41 in the bolt shank and has its transversely enlarged head 42 engaging the inner end face of washer 128 to hold that washer against the inner end face of sleeve 123.

In each of the disclosed embodiments of the present switch, the only part that is accessible outside the housing is the bolt head, which is capable of only a very limited rocking movement, as described. The bolt head is much less prone to vandalism than the usual reciprocable push-button on a telephone switch. The rest of the present switch is enclosed in the housing, which can be made very resistant to careless use or deliberate attack. Consequently, the present switch assembly is very well suited for use in public pay phones, or intercom panels which are accessible to the public, or in various other installations where careless use and vandalism have been likely to occur.

In the present switch assembly the bolt may be of electrically conductive material when it is desired that the closed switch contacts be grounded through the body of the person whose finger pushes against the bolt head. In that case the current path is through fixed contact 14, contact member 28, the screw-threaded segment 18 of the bolt, the shank segment 17 of the bolt, the bolt head 20, and the person's body to ground. Alternatively, the bolt and the parts on it except the second switch contact member may be of dielectric material when such a grounding action is not desired. In that case the current path is through fixed contact 14 and contact member 28 between the different parts of the circuit to which they are connected respectively, such as by electrically conductive wires (not shown).

Each of the disclosed embodiments shows the present switch as a normally-open switch. However, if desired it could operate as a normally-closed switch by positioning the first switch contact member 14 below the bolt shank with its contact face 15 facing upward, so that in its normal, downwardly-tilted position the bolt shank would put the second switch contact member 28 (or 28' or 128) in contact with the first switch contact member, and a person's finger pressing against the bolt head would raise the second switch contact member out of engagement with the first switch contact member.

I claim:

1. In an electrical switch assembly, the combination of:

- a housing having a rigid upwardly extending panel with a flat outer face, a flat inner face extending parallel to said outer face, and an opening extending perpendicularly between said outer and inner faces;
- a first switch contact member of electrically conductive material inside said housing behind said panel presenting an exposed contact face at a level offset vertically from said opening in said panel;
- a rigid bolt having an elongated straight shank passing through said opening in the panel with a slight up-and-down clearance and offset vertically from said contact face of said first switch contact member, said bolt having an enlarged head outside said panel which has a flat rear face extending substantially perpendicular to the axis of its shank;
- a second switch contact member of electrically conductive material extending transversely from said shank of the bolt toward said contact face of said first switch contact member;
- a rigid transverse member on said shank of the bolt directly behind said inner face of said housing panel;
- and positioning means which positions said transverse member a slightly greater distance from said rear face of the bolt head than the thickness of said housing panel between its outer and inner faces at said opening, whereby to provide enough play between the bolt head and the outer face of the housing panel when said transverse member engages the inner face of said panel to enable said shank of the bolt to tilt down at a slight angle behind said housing panel enough to hold said second switch contact member in a first position with respect to said contact face of said first switch contact member;
- said bolt being displaceable by manual pressure on the front of said bolt head to position said rear face of the bolt head flush against said outer face of said housing panel around said opening and raise said shank of the bolt to a position in which said second switch contact member assumes a second position with respect to said contact face of said first switch contact member, one of said positions of said second contact member being a switch-opening position and the other being a switch-closing position.

2. A switch assembly according to claim 1 wherein:
said first switch contact member presents said exposed contact face thereof facing downward at a level slightly above that of the top edge of said opening in the panel;
said second switch contact member extends up from said shank of the bolt directly below said contact face of the first switch contact member;
said bolt when it tilts down holds said second switch contact member in said first position spaced below said contact face of the first switch contact member;
and said bolt when displaced by said manual pressure on its head raises said second switch contact member to said second position engaging said contact face of the first switch contact member.

3. A switch assembly according to claim 2 wherein:
said transverse member is a rigid, flat, annular washer on the shank of the bolt.

4. A switch assembly according to claim 3 wherein:
said second switch contact member is a rigid, annular, electrically conductive washer on the shank of the bolt.

5. A switch assembly according to claim 4 wherein:
the shank of the bolt is screw threaded between said washers;
and said positioning means comprises nut means threadedly engaging the shank of the bolt between said washers.

6. A switch assembly according to claim 5 wherein:
the shank of the bolt is screw threaded behind said second switch contact member;
and further comprising:
a nut threaded onto the shank of the bolt behind said second switch contact member and holding the latter against said nut means.

7. A switch assembly according to claim 6 wherein:
said nut means comprises a plurality of nuts in succession along the shank of the bolt.

8. A switch assembly according to claim 1 wherein:
said transverse member is a rigid, annular washer having a flat outer face next to said inner face of the housing panel.

9. A switch assembly according to claim 1 wherein:
said second switch contact member is a rigid, annular, electrically conductive washer on the shank of the bolt.

10. A switch assembly according to claim 8 wherein:
said second switch contact member is a rigid, annular, electrically conductive washer on the shank of the bolt;
the shank of the bolt is screw threaded between said washers;
and said positioning means comprises nut means threadedly engaging the shank of the bolt between said washers.

11. A switch assembly according to claim 10 wherein:
the shank of the bolt is screw threaded behind said second switch contact member;
and further comprising:
a nut threaded onto the shank of the bolt behind said second switch contact member and holding the latter against said nut means.

12. A switch assembly according to claim 1 wherein:
the shank of the bolt is screw threaded between said transverse member and said second switch contact member;
and said positioning means comprises nut means threadedly engaging the shank of the bolt between said transverse member and said second switch contact member.

13. A switch assembly according to claim 12 wherein:
the shank of the bolt is screw threaded behind said second switch contact member;
and further comprising:
a nut threaded onto the shank of the bolt behind said second switch contact member and holding the latter against said nut means.

* * * * *